J. DE W. SMITH.
AUTOMOBILE WHEEL RIM.
APPLICATION FILED NOV. 11, 1915.
1,254,546.
Patented Jan. 22, 1918.
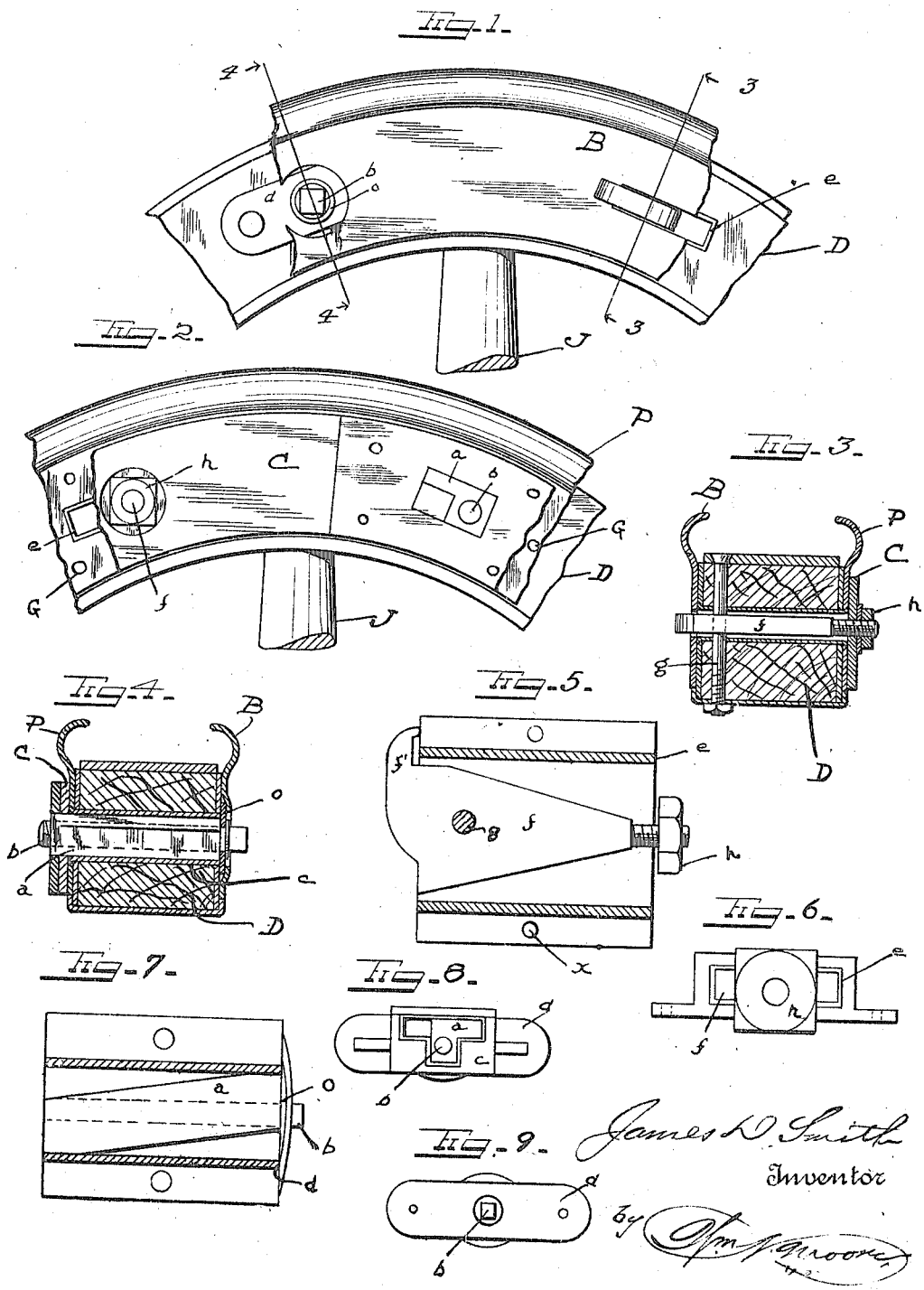

UNITED STATES PATENT OFFICE.

JAMES DE WITT SMITH, OF ORLAND, CALIFORNIA, ASSIGNOR OF ONE-HALF TO JULIUS M. UTZ, OF ORLAND, CALIFORNIA.

AUTOMOBILE-WHEEL RIM.

1,254,546.　　Specification of Letters Patent.　　Patented Jan. 22, 1918.

Application filed November 11, 1915. Serial No. 60,911.

*To all whom it may concern:*

Be it known that I, JAMES D. SMITH, a citizen of the United States of America, residing at Orland, in the county of Glenn and State of California, have invented certain new and useful Improvements in Automobile-Wheel Rims, of which the following is a specification.

My invention relates to improvements in automobile wheel rims, in which a combination of different parts operated by a key to rigidly secure one side of the rim engaging plate to the felly by clamps, is employed.

The main object of this invention is the production of an automobile wheel rim which will reduce the time required by the rims now in use to secure the tire on a rim and the rim on the felly.

In the accompanying drawings I have illustrated one complete example of the physical embodiment of my invention constructed according to the best mode I have so far devised for the practical application of the principles of my invention.

Figure 1 represents a side view in elevation of a portion of an automobile wheel equipped with my invention.

Fig. 2 represents a view similar to Fig. 1 of the opposite side of an automobile wheel.

Fig. 3 represents a transverse sectional view taken on line 3—3 of Fig. 1.

Fig. 4 represents a transverse sectional view taken on line 4—4 of Fig. 1.

Figs. 5 and 6 represent detail views of the novel pivoted clamping member employed in my invention, and Figs. 7, 8 and 9 represent detail views of the novel locking key member used in combination with the clamping member.

My invention relates to that particular class of wheels embracing pneumatic tires wherein the latter are of the well known clencher or of similar standard type, and wherein is employed a mechanical contrivance securing and releasing the tires to and from the rim.

As will hereinafter appear, I provide by my invention a simple and secure means for securely clamping the tire and rim upon the wheel, the said means being so constructed as to permit of ready removal for repair or other purposes.

The letter J designates an ordinary substantially constructed wooden wheel having the felly D of the usual construction on one side of which is secured by means of fastenings G, the fixed tire engaging plate P, to which is removably secured the ring plate C, the purpose of which will be hereinafter described.

Secured in the felly at spaced intervals are the casings $c$, having each a head $d$ for retaining a collar $o$ in its proper position on a bolt $b$ which engages the threaded opening in a locking key $a$, said threaded opening being parallel with the walls of the casing $c$ and said key $a$ being diagonally disposed in the casing and engaging an opening in the ring plate C, locking the pivoted clamp $f$ in position as will be hereinafter set forth.

The pivoted clamp $f$, is also secured in the felly in the casing $e$, by fastening $x$, and is pivoted in said casing by the pivot $g$, and has one end reduced and threaded and engaging an opening in the ring plate C, upon which end is the nut $h$, for binding the clamp in locked position as hereinafter stated. The other end of the clamp $f$, is formed with a lip or hook $f'$, which passes through an opening or slot in the removable plate B, and is adapted to engage and retain said plate in position.

The flanges of the tire it will be understood are engaged by the plates B and P and to secure the tire in place the plates B and P are adjusted to fit upon the flanges and in position having the proper slots registering with the clamps $f$, next turn the plate B around so that the plate will slip under the hook or lip $f'$ of the clamp, when the bolt or bolts $b$ are unscrewed forcing the keys $a$ outwardly locking the clamps in locked position through the diagonal slant of the keys $a$ tending to turn the ring plate C around the wheel thus causing the clamps to bind more tightly the removable plate B, when the nuts $h$ are tightened to further lock the clamps.

As will be readily seen, should the nuts $h$ become loose, the keys $a$ will prevent the clamps $f$ from becoming unlocked.

Having thus described my invention, what I claim as new and patentable is:—

1. The combination with a wheel having a fixed and a removable tire engaging plate, of means for retaining said removable plate in proper position, said means consisting of pivoted clamps mounted in the felly of said wheel, a ring plate next to the fixed plate, said pivoted clamps engaging said ring plate and removable plate, and locking keys for preventing the pivoted clamps from disengaging the removable plate, substantially as described.

2. In an automobile wheel, the combination with a removable plate, of pivoted clamp members mounted in casings secured at intervals in the felly of said wheel, said clamp members being so arranged as to clamp the removable plate to the wheel, and locking members for preventing the pivoted clamp members from disengaging the removable plate, all as described.

In this invention all claims are set forth for the purpose specified.

JAMES DE WITT SMITH.

Witnesses:
T. J. HICKS,
W. L. THOMPSON.